United States Patent
Wang

(10) Patent No.: US 10,564,812 B2
(45) Date of Patent: Feb. 18, 2020

(54) INFORMATION PROCESSING METHOD AND ELECTRONIC DEVICE

(71) Applicants: Beijing Lenovo Software Ltd., Beijing (CN); Lenovo (Beijing) Limited, Beijing (CN)

(72) Inventor: Tao Wang, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 470 days.

(21) Appl. No.: 14/755,330

(22) Filed: Jun. 30, 2015

(65) Prior Publication Data

US 2016/0202860 A1    Jul. 14, 2016

(30) Foreign Application Priority Data

Jan. 12, 2015    (CN) .......................... 2015 1 0015021

(51) Int. Cl.
*G06F 3/0483* (2013.01)
*G06F 17/21* (2006.01)
(Continued)

(52) U.S. Cl.
CPC ............ *G06F 3/0483* (2013.01); *G06F 3/013* (2013.01); *G06F 3/015* (2013.01); *G06F 3/0346* (2013.01);
(Continued)

(58) Field of Classification Search
CPC .... G06F 17/212; G06F 17/214; G06F 17/217; G06F 3/0483; G06F 3/0484; G06F 3/017;
(Continued)

(56) References Cited

U.S. PATENT DOCUMENTS 9,335,819 B1 *  5/2016  Jaeger .................... G06F 3/013
9,606,622 B1 *  3/2017  Brothers ................ G06F 3/013
(Continued)

FOREIGN PATENT DOCUMENTS

CN    101470567 A    7/2009
CN    102063252 A    5/2011
(Continued)

OTHER PUBLICATIONS

"Chinese Application No. 201510015021.5, Office Action dated May 2, 2017", (May 2, 2017), 7 pgs.
(Continued)

*Primary Examiner* — Chau T Nguyen
(74) *Attorney, Agent, or Firm* — Schwegman Lundberg & Woessner, P.A.

(57) ABSTRACT

The present disclosure discloses an information processing method and an electronic device. The method comprises: detecting a first operation of a user on a first page displayed on the display unit at a first time, to form a first operating parameter, wherein the first page has first display information displayed thereon; when the first operating parameter satisfies a first preset condition, forming and recording first indication information to indicate the first display information; detecting a second operation of the user on the first page at a second time to form a second operating parameter; judging whether the second operating parameter satisfies a second preset condition; and when the second operating parameter satisfies the second preset condition, controlling the display unit according to the first indication information to perform a first preset operation associated with displaying the first display information, wherein the second time is later than the first time.

18 Claims, 4 Drawing Sheets

(51) Int. Cl.
*G06F 3/01* (2006.01)
*G06F 3/0346* (2013.01)
*G06F 3/0484* (2013.01)
*G06F 16/48* (2019.01)

(52) U.S. Cl.
CPC .......... *G06F 3/04847* (2013.01); *G06F 16/48* (2019.01); *G06F 17/212* (2013.01); *G06F 17/214* (2013.01); *G06F 17/217* (2013.01)

(58) Field of Classification Search
CPC .......... G06F 16/48; G06F 3/013; G06F 3/015; G06F 3/0346; G06F 3/04847
See application file for complete search history.

(56) References Cited

U.S. PATENT DOCUMENTS

| | | | | |
|---|---|---|---|---|
| 2007/0209007 | A1* | 9/2007 | Phillips | G06F 3/0485 715/738 |
| 2007/0244903 | A1* | 10/2007 | Ratliff | G06F 16/48 |
| 2010/0095219 | A1* | 4/2010 | Stachowiak | G06F 17/30884 715/745 |
| 2010/0332565 | A1* | 12/2010 | Al-Shaykh | H04N 7/163 707/912 |
| 2012/0030569 | A1* | 2/2012 | Migos | G06F 3/04845 715/702 |
| 2012/0209841 | A1* | 8/2012 | Saretto | G06F 17/218 707/736 |
| 2013/0283145 | A1* | 10/2013 | Argent | G06F 17/241 715/231 |
| 2014/0143705 | A1 | 5/2014 | Boulanger et al. | |
| 2014/0317200 | A1* | 10/2014 | Lucero | H04L 51/00 709/206 |
| 2015/0007104 | A1* | 1/2015 | Zhu | G06F 3/0486 715/802 |
| 2015/0058723 | A1* | 2/2015 | Cieplinski | G06F 3/04855 715/702 |
| 2016/0124505 | A1* | 5/2016 | Liu | G06F 3/013 345/156 |
| 2016/0198229 | A1* | 7/2016 | Keipert | H04N 21/47217 725/12 |

FOREIGN PATENT DOCUMENTS

| | | |
|---|---|---|
| CN | 103558972 A | 2/2014 |
| CN | 103914523 A | 7/2014 |

OTHER PUBLICATIONS

"Chinese Application No. 201510015021.5, Office Action dated Dec. 25, 2017", (Dec. 25, 2017), 6 pgs.

* cited by examiner

INFORMATION PROCESSING METHOD AND ELECTRONIC DEVICE

CROSS-REFERENCE TO RELATED APPLICATION(S)

This application claims the benefit under 35 U.S.C. 119 to Chinese Patent Application No. 201510015021.5, filed on Jan. 12, 2015, entitled "INFORMATION PROCESSING METHOD AND ELECTRONIC DEVICE" which application is incorporated herein by reference in its entirety.

TECHNICAL FIELD

The present disclosure relates to information processing technology in the field of display, and in particular, to an information processing method and an electronic device.

BACKGROUND

With the development of information technology and electronic device technology, more and more consumers are used to acquire information such as information on the Internet or read an electronic book, an electronic magazine or the like by using electronic devices. However, mass information is typically provided on the electronic device, and after a user views or pays attention to some information by using an electronic device, it is very difficult to find the information later. Obviously, the electronic devices are not intelligent enough, and thus cannot satisfy users' requirements for convenient inquiry of information which has been viewed or paid attention to, thereby resulting in reduced users' satisfaction.

SUMMARY

In view of this, embodiments of the present disclosure provide an information processing method and an electronic device, to solve the problem that electronic devices are not intelligent enough and users' satisfaction is low.

In order to achieve the above purpose, the technical solutions of the present disclosure are implemented as follows.

In a first aspect of the embodiments of the present disclosure, an information processing method applied in an electronic device comprising a display unit is provided. The information processing method comprises: detecting a first operation of a user on a first page displayed on the display unit at a first time, to form a first operating parameter, wherein the first page has first display information displayed thereon; when the first operating parameter satisfies a first preset condition, forming and recording first indication information to indicate the first display information; detecting a second operation of the user on the first page at a second time to form a second operating parameter; judging whether the second operating parameter satisfies a second preset condition; and when the second operating parameter satisfies the second preset condition, controlling the display unit according to the first indication information to perform a first preset operation associated with displaying the first display information, wherein the second time is later than the first time.

Preferably, the first operating parameter is a first retention duration during which the first display information is retained to be displayed on the display unit.

Preferably, the judging of whether the second operating parameter satisfies a second preset condition comprises: when the first retention duration is greater than a first time threshold, determining that the first operating parameter satisfies the first preset condition.

Preferably, the judging of whether the second operating parameter satisfies a second preset condition comprises: determining a first movement direction of the first page according to the second operating parameter; and when the first movement direction is a direction in which the first page is moved towards the first display information, determining that the second operating parameter satisfies the second preset condition.

Preferably, the judging of whether the second operating parameter satisfies a second preset condition comprises: determining a first movement speed of the first page according to the second operating parameter; and when the first movement speed is less than a first speed threshold, determining that the second operating parameter satisfies the second preset condition.

Preferably, the controlling of the display unit according to the first indication information to perform a first preset operation associated with displaying the first display information comprises: determining a first position of the first display information on the first page according to the first indication information; and controlling the display unit to perform the first preset operation associated with the first position.

Preferably, the first indication information comprises position information of the first display information on the first page; and wherein the determining of a first position of the first display information on the first page according to the first indication information comprises: determining the first position of the first display information on the first page according to the position information.

Preferably, the first indication information comprises first identity information of the first display information; and wherein the determining of a first position of the first display information on the first page according to the first indication information comprises: matching the first identity information with identity information of various display information on the first page to form a matching result; and determining the first position of the first display information on the first page according to the matching result.

Preferably, the controlling of the display unit to perform the first preset operation associated with the first position comprises: controlling the display unit to display the first display information according to the first position.

Preferably, the controlling of the display unit to perform the first preset operation associated with the first position comprises: displaying information in the first position on the first page according to a first display parameter value so that the first display information differs from second display information displayed according to a second display parameter value; wherein the second display information is display information on the first page surrounding the first display information; and wherein the first display parameter value and the second display parameter value are different parameter values of the same display parameter.

Preferably, the display parameter comprises a luminance parameter and/or a color parameter.

In a second aspect of the embodiments of the present disclosure, an electronic device comprising a display unit is provided. The electronic device further comprises a detection unit, a formation unit, a judgment unit, and a control unit, wherein the detection unit is configured to detect a first operation of a user on a first page displayed on the display unit at a first time, to form a first operating parameter, wherein the first page has first display information displayed thereon; the formation unit is configured to, when the first operating parameter satisfies a first preset condition, form and record first indication information to indicate the first display information; the detection unit is further configured to detect a second operation of the user on the first page at a second time to form a second operating parameter; the judgment unit is configured to judge whether the second operating parameter satisfies a second preset condition; and the control unit is configured to, when the second operating parameter satisfies the second preset condition, control the display unit according to the first indication information to perform a first preset operation associated with displaying the first display information, wherein the second time is later than the first time.

Preferably, the first operating parameter is a first retention duration during which the first display information is retained to be displayed on the display unit.

Preferably, the judgment unit is further configured to, when the first retention duration is greater than a first time threshold, determine that the first operating parameter satisfies the first preset condition.

Preferably, the judgment unit is further configured to, determine a first movement direction of the first page according to the second operating parameter; and when the first movement direction is a direction in which the first page is moved towards the first display information, determine that the second operating parameter satisfies the second preset condition.

Preferably, the judgment unit is further configured to, determine a first movement speed of the first page according to the second operating parameter; and when the first movement speed is less than a first speed threshold, determine that the second operating parameter satisfies the second preset condition.

Preferably, the control unit is further configured to determine a first position of the first display information on the first page according to the first indication information; and control the display unit to perform the first preset operation associated with the first position.

Preferably, the first indication information comprises position information of the first display information on the first page; and the control unit is further configured to determine the first position of the first display information on the first page according to the position information.

Preferably, the first indication information comprises first identity information of the first display information; and the control unit is further configured to match the first identity information with identity information of various display information on the first page to form a matching result; and determine the first position of the first display information on the first page according to the matching result.

Preferably, the control unit is further configured to control the display unit to display the first display information according to the first position.

Preferably, the control unit is further configured to display information in the first position on the first page according to a first display parameter value so that the first display information differs from second display information displayed according to a second display parameter value; wherein the second display information is display information on the first page surrounding the first display information; and wherein the first display parameter value and the second display parameter value are different parameter values of the same display parameter.

Preferably, the display parameter comprises a luminance parameter and/or a color parameter.

With the information processing method and electronic device according to the embodiments of the present disclosure, when the first operating parameter of the first display information satisfies the first preset condition, the first indication information is generated to indicate the first display information, which facilitate rapidly positioning the first display information and performing the first preset operation according to the indication information when the second operating parameter satisfies the second preset condition at a second time later, to display or highlight the first display information, which assists the user in searching for and positioning the first display information. Obviously, the information processing method and electronic device according to the embodiments of the present disclosure better utilize the software and hardware resources of the electronic device, and improve the intelligence of the electronic device and the users' satisfaction.

DETAILED DESCRIPTION

The technical solutions of the present disclosure will be further described in detail below in conjunction with accompanying drawings and specific embodiments.

First method embodiment

Figure 1:
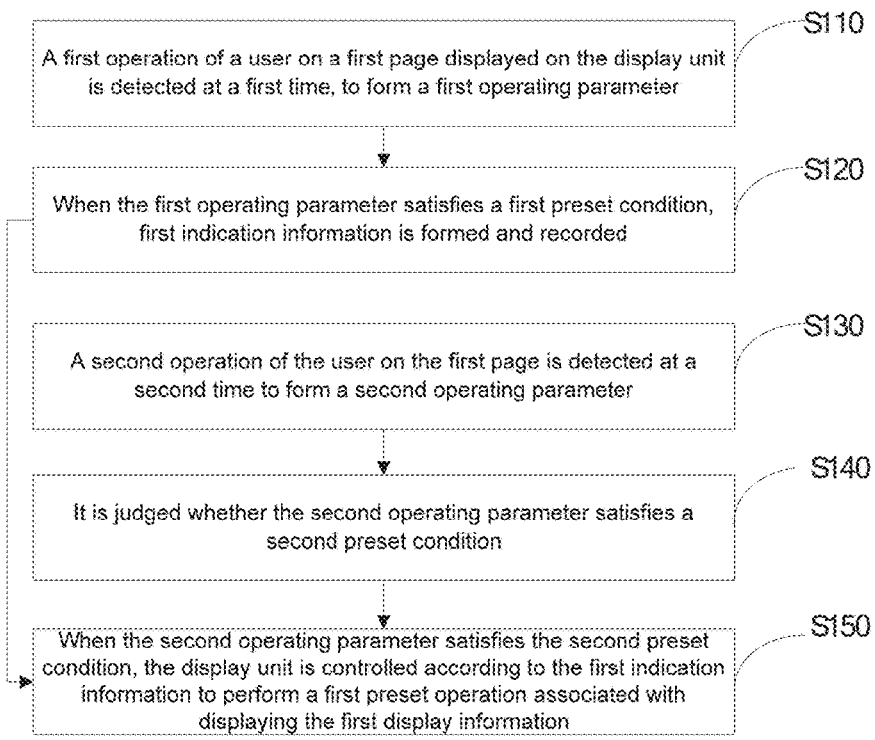
FIG. 1 is a flowchart of an information processing method according to an embodiment of the present disclosure.

As shown in FIG. 1, the present embodiment provides an information processing method applied in an electronic device comprising a display unit, the method comprising the following steps.

In step S110, a first operation of a user on a first page displayed on the display unit is detected at a first time, to form a first operating parameter, wherein the first page has first display information displayed thereon.

In step S120, when the first operating parameter satisfies a first preset condition, first indication information is formed and recorded to indicate the first display information.

In step S130, a second operation of the user on the first page is detected at a second time to form a second operating parameter.

In step S140, it is judged whether the second operating parameter satisfies a second preset condition.

In step S150, when the second operating parameter satisfies the second preset condition, the display unit is controlled according to the first indication information to perform a first preset operation associated with displaying the first display information.

The second time is later than the first time.

Here, the first time is any time when the electronic device is used by the user, and the second time is any time later than the first time.

The first page may be a webpage, an information presentation page for various applications, or a document read page or the like.

The first operation may be an operation of a user looking up the first display information, or may also be an operation of a user editing the first display information, or the like.

In step S120, when it is determined that the first operating parameter satisfies the first preset condition, the first indication information is formed and recorded. The first indication information here is recorded by storing the first indication information. The first indication information is used to indicate the first display information. The first display information may be found on the first page according to the first indication information.

The first display information may be text information, picture information, a combination of picture information and text information, or video information or the like. The first display information may be various information which can be displayed on the electronic device. For example, the first display information may be news and advisories, electronic books, or entertainments or the like according to the classification of the information content.

It is detected that a second operation is input by a user to the electronic device at a second time later than the first time. A second operating parameter corresponding to the second operation is formed by detecting the second operation. When the second operating parameter satisfies a second preset condition, the display unit is controlled to perform a first preset operation associated with the first display information.

The first preset operation may comprise an operation of positioning the first display information displayed on the first page, or an operation of highlighting the first display information to facilitate the user to search for or directly open a sub-page of the first page for explicitly displaying the first display information or the like.

In conclusion, the present embodiment provides an information processing method, which can facilitate a user to search for display information which has been concerned before the current time, better utilize software and hardware resources of the electronic device, and improve the intelligence of the electronic device and the users' satisfaction. When the user uses the electronic device adopting the information processing method according to the present embodiment, the user needs not to sequentially search for the information which has previously been operated from the mass display information in the electronic device.

Second method embodiment

As shown in FIG. 1, the present embodiment provides an information processing method applied in an electronic device comprising a display unit, the method comprising the following steps.

In step S110, a first operation of a user on a first page displayed on the display unit is detected at a first time, to form a first operating parameter, wherein the first page has first display information displayed thereon.

In step S120, when the first operating parameter satisfies a first preset condition, first indication information is formed and recorded to indicate the first display information.

In step S130, a second operation of the user on the first page is detected at a second time to form a second operating parameter.

In step S140, it is judged whether the second operating parameter satisfies a second preset condition.

In step S150, when the second operating parameter satisfies the second preset condition, the display unit is controlled according to the first indication information to perform a first preset operation associated with displaying the first display information.

The second time is later than the first time.

The first operating parameter is a first retention duration during which the first display information is retained to be displayed on the display unit.

When the first display information is retained to be displayed on the display unit for a long time in response to a user touching a screen, clicking a mouse, manipulating controls or the like, it may be the case that the user is hesitating about whether it needs to further view the detailed content information of the first display information. Generally, the first display information may be title or abstract information or the like of the detailed information of the first display information.

In a case that a user suddenly wants to view the first display information again when the first display information has no longer been displayed on the first page or the first display information has not been found by the user at a second time, according to the existing method, the user needs to manually search for the first display information from mass information through eye recognition, which obviously results in the electronic device being not intelligent enough. In the present embodiment, first indication information is formed according to the first retention duration, and the first display information can be rapidly found according to the first indication information. Therefore, the technical solution according to the present embodiment assists the user in searching for the first display information, thereby improving the intelligence of the electronic device and the users' satisfaction.

Third method embodiment

As shown in FIG. 1, the present embodiment provides an information processing method applied in an electronic device comprising a display unit, the method comprising the following steps.

In step S110, a first operation of a user on a first page displayed on the display unit is detected at a first time, to form a first operating parameter, wherein the first page has first display information displayed thereon.

In step S120, when the first operating parameter satisfies a first preset condition, first indication information is formed and recorded to indicate the first display information.

In step S130, a second operation of the user on the first page is detected at a second time to form a second operating parameter.

In step S140, it is judged whether the second operating parameter satisfies a second preset condition.

In step S150, when the second operating parameter satisfies the second preset condition, the display unit is controlled according to the first indication information to perform a first preset operation associated with displaying the first display information.

The second time is later than the first time.

The first operating parameter is a first retention duration during which the first display information is retained to be displayed on the display unit.

The method according to the present embodiment further comprises: when the first retention duration is greater than a first time threshold, determining that the first operating parameter satisfies the first preset condition.

It may be determined whether the first display information is the information a user hesitates about whether to view or wants to view by comparing the first retention duration of the first display information on the first page with the first time threshold. The first time threshold is typically a preset minimum duration which satisfies the first preset condition. Therefore, when the first retention duration is greater than the first time threshold, it is considered that the first operating parameter satisfies the first time threshold. A specific value of the first time threshold may be determined according to statistical data of operating habits of most users, or may also be determined according to users' operating habits or historical operating data of different electronic devices. There are many approaches to determine the value of the first time threshold, which will not be described here in detail.

The technical solution of determining whether the first preset condition is satisfied by comparing the first retention duration with the first time threshold has an advantage that it is simple and convenient to implement.

Fourth method embodiment

As shown in FIG. 1, the present embodiment provides an information processing method applied in an electronic device comprising a display unit, the method comprising the following steps.

In step S110, a first operation of a user on a first page displayed on the display unit is detected at a first time, to form a first operating parameter, wherein the first page has first display information displayed thereon.

In step S120, when the first operating parameter satisfies a first preset condition, first indication information is formed and recorded to indicate the first display information.

In step S130, a second operation of the user on the first page is detected at a second time to form a second operating parameter.

In step S140, it is judged whether the second operating parameter satisfies a second preset condition.

In step S150, when the second operating parameter satisfies the second preset condition, the display unit is controlled according to the first indication information to perform a first preset operation associated with displaying the first display information.

The second time is later than the first time.

The first operating parameter is a first retention duration during which the first display information is retained to be displayed on the display unit.

Step S140 may comprise: determining a first movement direction of the first page according to the second operating parameter; and when the first movement direction is a direction in which the first page is moved towards the first display information, determining that the second operating parameter satisfies the second preset condition.

The second operating parameter is formed by detecting a second operation of the user. The second operation may be used to control the information which is currently displayed on the display unit. In an example, in a case that the first page is moved down in response to an input operation from a user from a first time to a second time, if the user wants to return to search for the first display information, the first page may be controlled by a sliding or touch operation or the like to move the first page up.

Therefore, in the present embodiment, it may be determined whether the second operating parameter satisfies the second preset condition by determining whether the user wants to search for the first display information which has been concerned according to the first movement direction of the first page which is determined according to the second parameter.

On the basis of the first method embodiment, the second method embodiment, and the third method embodiment, the present embedment adds a technical solution of how to determine whether the second operating parameter satisfies the second preset condition, which has an advantage that it is simple and convenient to implement.

Fifth method embodiment

As shown in FIG. 1, the present embodiment provides an information processing method applied in an electronic device comprising a display unit, the method comprising the following steps.

In step S110, a first operation of a user on a first page displayed on the display unit is detected at a first time, to form a first operating parameter, wherein the first page has first display information displayed thereon.

In step S120, when the first operating parameter satisfies a first preset condition, first indication information is formed and recorded to indicate the first display information.

In step S130, a second operation of the user on the first page is detected at a second time to form a second operating parameter.

In step S140, it is judged whether the second operating parameter satisfies a second preset condition.

In step S150, when the second operating parameter satisfies the second preset condition, the display unit is controlled according to the first indication information to perform a first preset operation associated with displaying the first display information.

The second time is later than the first time.

Step S140 may comprise: determining a first movement speed of the first page according to the second operating parameter; and when the first movement speed is less than a first speed threshold, determining that the second operating parameter satisfies the second preset condition.

The present embodiment is implemented based on the first movement speed of the first page. When a user wants to search for information, the page is generally not controlled by the user to rapidly move since it is not convenient to search for the information. Therefore, in the present embodiment, it may be determined whether the second operating parameter satisfies the second preset condition based on this characteristic.

When the first movement speed is small enough, for example, the first movement speed is less than a predetermined first speed threshold, it is determined that the second operating parameter satisfies the second preset condition.

In a specific implementation, it may further be judged whether the second operating parameter satisfies the second preset condition by combining the method according to the fourth method embodiment and the method according to the present embodiment.

When the first page is controlled in the second operation to move towards the first display information at a first movement speed less than the first speed threshold, it indicates that the user wants to search for the first display information. In this case, it is considered that the second operating parameter satisfies the second preset condition. The technical solution of determining whether the second operating parameter satisfies the second preset condition by combining the technical solution according to the fourth method embodiment and the technical solution according to the present embodiment can increase the accuracy of the judgment and further improve the intelligence of the electronic device and the user's satisfaction.

Sixth method embodiment

As shown in FIG. 1, the present embodiment provides an information processing method applied in an electronic device comprising a display unit, the method comprising the following steps.

In step S110, a first operation of a user on a first page displayed on the display unit is detected at a first time, to form a first operating parameter, wherein the first page has first display information displayed thereon.

In step S120, when the first operating parameter satisfies a first preset condition, first indication information is formed and recorded to indicate the first display information.

In step S130, a second operation of the user on the first page is detected at a second time to form a second operating parameter.

In step S140, it is judged whether the second operating parameter satisfies a second preset condition.

In step S150, when the second operating parameter satisfies the second preset condition, the display unit is controlled according to the first indication information to perform a first preset operation associated with displaying the first display information.

The second time is later than the first time.

Step S150 may comprise the following steps.

In step S151, a first position of the first display information on the first page is determined according to the first indication information.

In step S152, the display unit is controlled to perform a first preset operation associated with the first position.

On the basis of any of the embodiments described above, the present embodiment specifically describes how to perform the first preset operation associated with the first display information. Firstly, the display position of the first display information on the first page, i.e., the first position, is determined according to the first indication information, so as to control the display unit to perform the first preset operation associated with the first position, for example, display information in the first position on the first page. In an example, the first page has a length of 20 cm in total, and the first position is at a distance of 5 cm-7 cm from an upper edge of the first page. If the display unit currently can only display information in a length of 10 cm of the first page, in the present embodiment, the display unit may be controlled to display the information at a distance of 5 cm-7 cm from the upper edge of the first page.

Step S150 according to the present embodiment has an advantage that it is simple and convenient to implement.

Seventh method embodiment

As shown in FIG. 1, the present embodiment provides an information processing method applied in an electronic device comprising a display unit, the method comprising the following steps.

In step S110, a first operation of a user on a first page displayed on the display unit is detected at a first time, to form a first operating parameter, wherein the first page has first display information displayed thereon.

In step S120, when the first operating parameter satisfies a first preset condition, first indication information is formed and recorded to indicate the first display information.

In step S130, a second operation of the user on the first page is detected at a second time to form a second operating parameter.

In step S140, it is judged whether the second operating parameter satisfies a second preset condition.

In step S150, when the second operating parameter satisfies the second preset condition, the display unit is controlled according to the first indication information to perform a first preset operation associated with displaying the first display information.

The second time is later than the first time.

Step S150 may comprise the following steps.

In step S151, a first position of the first display information on the first page is determined according to the first indication information.

In step S152, the display unit is controlled to perform a first preset operation associated with the first position.

The first indication information comprises the position information of the first display information on the first page.

Step S151 comprises: determining the first position of the first display information on the first page according to the position information.

In the present embodiment, the first indication information directly records the position information of the first display information on the first page, and thus the first position of the first display information on the first page can be directly determined according to the position information. Therefore, this technical solution has an advantage that it is simple and convenient to implement.

Eighth method embodiment

As shown in FIG. 1, the present embodiment provides an information processing method applied in an electronic device comprising a display unit, the method comprising the following steps.

In step S110, a first operation of a user on a first page displayed on the display unit is detected at a first time, to form a first operating parameter, wherein the first page has first display information displayed thereon.

In step S120, when the first operating parameter satisfies a first preset condition, first indication information is formed and recorded to indicate the first display information.

In step S130, a second operation of the user on the first page is detected at a second time to form a second operating parameter.

In step S140, it is judged whether the second operating parameter satisfies a second preset condition.

In step S150, when the second operating parameter satisfies the second preset condition, the display unit is controlled according to the first indication information to perform a first preset operation associated with displaying the first display information.

The second time is later than the first time.

Step S150 may comprise the following steps.

In step S151, a first position of the first display information on the first page is determined according to the first indication information.

In step S152, the display unit is controlled to perform a first preset operation associated with the first position.

The first indication information comprises the position information of the first display information on the first page.

The first indication information comprises first identity information of the first display information.

Step S151 may comprise: matching the first identity information with identity information of various display information on the first page to form a matching result; and determining a first position of the first display information on the first page according to the matching result.

Here, the first identity information may be title information of the first display information, a source address of the first display information, or the like. The first identity information may be used to uniquely determine the first display information on the first page.

Therefore, in the present embodiment, the first identity information is matched with identities of various display information on the first page to determine the first position of the first display information on the first page.

On the basis of the first method embodiment to the sixth method embodiment, the present embodiment provides a technical solution of determining the first position information of the first display information, which is different from the technical solution according to the seventh method embodiment. The technical solution according to the present embodiment can also conveniently determine the first position of the first display information.

Ninth method embodiment

As shown in FIG. 1, the present embodiment provides an information processing method applied in an electronic device comprising a display unit, the method comprising the following steps.

In step S110, a first operation of a user on a first page displayed on the display unit is detected at a first time, to form a first operating parameter, wherein the first page has first display information displayed thereon.

In step S120, when the first operating parameter satisfies a first preset condition, first indication information is formed and recorded to indicate the first display information.

In step S130, a second operation of the user on the first page is detected at a second time to form a second operating parameter.

In step S140, it is judged whether the second operating parameter satisfies a second preset condition.

In step S150, when the second operating parameter satisfies the second preset condition, the display unit is controlled according to the first indication information to perform a first preset operation associated with displaying the first display information.

The second time is later than the first time.

Step S150 may comprise the following steps.

In step S151, a first position of the first display information on the first page is determined according to the first indication information.

In step S152, the display unit is controlled to perform a first preset operation associated with the first position.

Step S152 may comprise: controlling the display unit according to the first position to display the first display information.

In the present embodiment, after the first position is determined, the display unit is controlled to display the first display information. In this case, a phenomenon that a display position of the first page jumps may occur. In an example, in a case that a lower portion of the first page is displayed at the current time but the first display information is located on an upper portion of the first page, in order to display the first display information without changing the information distribution of the first page, it may need to switch from displaying the lower portion of the first page on the display unit to displaying the upper portion of the first page on the display unit. In this case, a phenomenon that the display position of the first page jumps occurs.

Further, for convenience of searching for the information by the user for another time, when the display unit is controlled according to the first position to display the first display information, a step of controlling the display unit to display the first display information in a predetermined position on the display unit is further comprised. In an example, the display unit is controlled to display the first display information on the top of the display unit, so that the user may not further control the first page to move after the first display information is displayed by jumping. Instead, the first display information is displayed in a predetermined position, which can prevent the user from searching for the first display information in the whole display area.

The predetermined position may be on the top of the display area, or may also be a center-upper position of the display area. The predetermined position may be in a position region which is often concerned by the user during the use of the electronic device.

In conclusion, on the basis of any of the method embodiments described above, the present embodiment provides a technical solution of how to control the display unit by the electronic device to perform the first preset operation. The technical solution has advantages that it is simple and convenient to implement and the first display information can be positioned and found by the user for another time.

Figure 2:
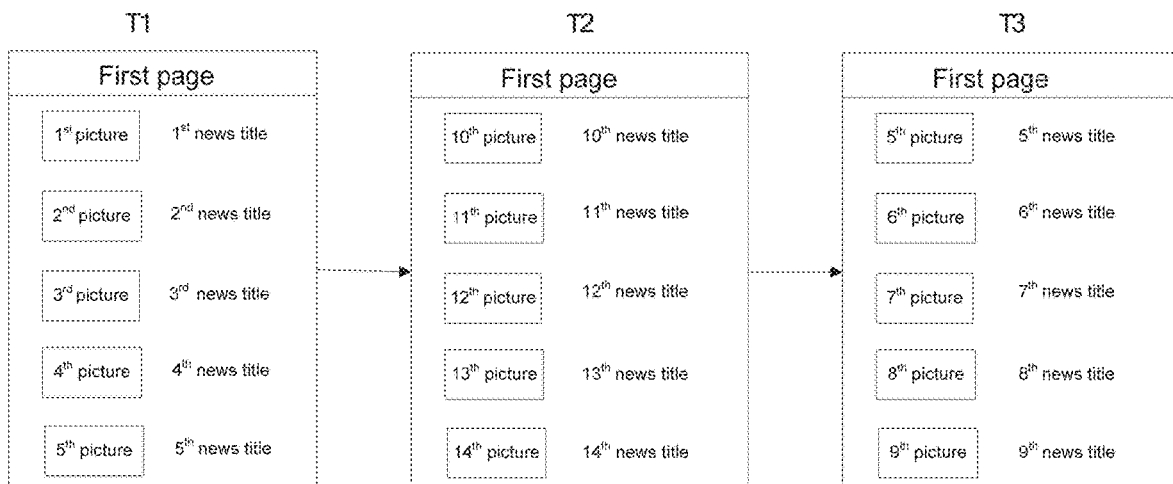
FIG. 2 is a first effect diagram of an information processing method according to an embodiment of the present disclosure.

As shown in FIG. 2, $1^{st}$ to $5^{th}$ pictures and $1^{st}$ to $5^{th}$ news titles are on the first page are displayed on the display unit at time T1, wherein the $n^{th}$ picture and the $n^{th}$ news title are information from the same news, and n is an integer no less than 1. The electronic device determines that a retention duration of the $5^{th}$ picture and the $5^{th}$ news title on the display unit is greater than the first predetermined time threshold by detecting the first operating parameter, and records the identity information and/or position information of the $5^{th}$ picture and the $5^{th}$ news title.

At a time T2 later than the time T1, $10^{th}$ to $14^{th}$ pictures and $10^{th}$ to $14^{th}$ news titles on the first page are displayed on the display unit. At the same time, a second operation input by a user is detected and an operating parameter corresponding to the second operation satisfies the second preset condition. Then, at a time T3 later than the time T2, the $5^{th}$ picture and the $5^{th}$ news title are displayed on the display unit according to the identity information and/or the position information.

In the present embodiment, the $5^{th}$ picture and the $5^{th}$ news title are displayed on the top of the display unit, and when the information is displayed on the display unit from the time T2 to the time T3, an effect that the displayed information jumps occurs.

Tenth method embodiment

As shown in FIG. 1, the present embodiment provides an information processing method applied in an electronic device comprising a display unit, the method comprising the following steps.

In step S110, a first operation of a user on a first page displayed on the display unit is detected at a first time, to form a first operating parameter, wherein the first page has first display information displayed thereon.

In step S120, when the first operating parameter satisfies a first preset condition, first indication information is formed and recorded to indicate the first display information.

In step S130, a second operation of the user on the first page is detected at a second time to form a second operating parameter.

In step S140, it is judged whether the second operating parameter satisfies a second preset condition.

In step S150, when the second operating parameter satisfies the second preset condition, the display unit is controlled according to the first indication information to perform a first preset operation associated with displaying the first display information.

The second time is later than the first time.

Step S150 may comprise the following steps.

In step S151, a first position of the first display information on the first page is determined according to the first indication information.

In step S152, the display unit is controlled to perform a first preset operation associated with the first position.

Step S152 may comprise: displaying information in the first position on the first page according to a first display parameter value so that the first display information differs from second display information displayed according to a second display parameter value; wherein, the second display information is display information on the first page surrounding the first display information; and the first display parameter value and the second display parameter value are different parameter values of the same display parameter.

In an example, a background color of the second display information surrounding the first display information is currently white. In order to highlight the second display information, when the first display information is displayed, the background thereof is displayed in green, yellow or the like which is different from white. In this way, the user can rapidly find the first display information.

The first display parameter value and the second display parameter value are different parameter values of the same display parameter. Here, the display parameter may be the background color described above, or may also be another display parameter, such as a display font style, a font size, a font color or the like of the first display information and the second display information, as long as a display effect of the first display information is different from a display effect of the second display information adjacent to or surrounding the first display information. In the present embodiment, the second display information represents one or more display information on the first page surrounding the first display information.

In a specific implementation, a display tag may further be added to the first display information to achieve the purpose of prompting the user. In an example, a float tag of the first display information is added. For example, a display label is generated when the step S150 is implemented, and is displayed in the position where the first display information is located. In this way, the display label plays a role in prompting the user, and can also facilitate the user to rapidly position the first display information.

In conclusion, on the basis of the first method embodiment to the eighth method embodiment, the present embodiment provides a method of performing the first preset operation, which is different from the tenth method embodiment. The technical solution according to the present embodiment can also achieve the purpose of assisting the user in rapidly positioning and finding the first display information and can also have an advantage that it is convenient and rapid to implement.

The display parameter may be any parameter which can be used to change the display effect of the first display information. In the present embodiment, a luminance parameter and/or a color parameter may be selected as the display parameter. The luminance parameter and the color parameter can generally bring a good visual impact effect to the user, thereby achieving the purpose of highlighting the first display information.

Figure 3:
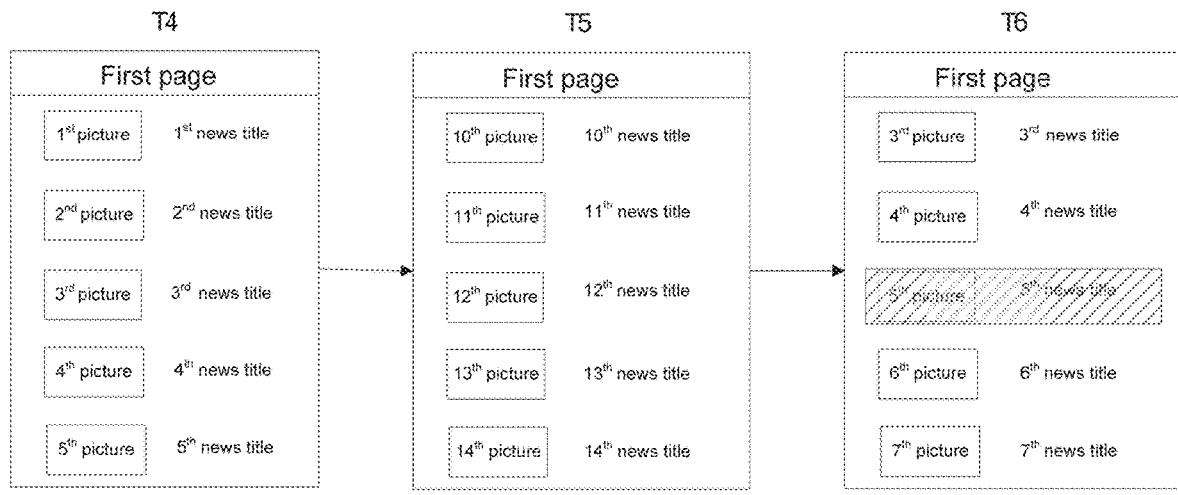
FIG. 3 is a second effect diagram of the information processing method according to an embodiment of the present disclosure.

As shown in FIG. 3, $1^{st}$ to $5^{th}$ pictures and $1^{st}$ to $5^{th}$ news titles are on the first page are displayed on the display unit at time T1, wherein the $n^{th}$ picture and the $n^{th}$ news title are information from the same news, and n is an integer no less than 1. The electronic device determines that a retention duration of the $5^{th}$ picture and the $5^{th}$ news title on the display unit is greater than the first predetermined time threshold by detecting the first operating parameter, and records the identity information and/or position information of the $5^{th}$ picture and the $5^{th}$ news title.

At a time T2 later than the time T1, $10^{th}$ to $14^{th}$ pictures and $10^{th}$ to $14^{th}$ news titles on the first page are displayed on the display unit. At the same time, a second operation input by a user is detected and an operating parameter corresponding to the second operation satisfies the second preset condition. Then, at a time T3 later than the time T2, the $5^{th}$ picture and the $5^{th}$ news title are highlighted on the display unit according to the identity information and/or the position information. In FIG. 3, the $5^{th}$ picture and the $5^{th}$ news title are highlighted by adding a background color to the $5^{th}$ picture and the $5^{th}$ news title.

First device embodiment

Figure 4:
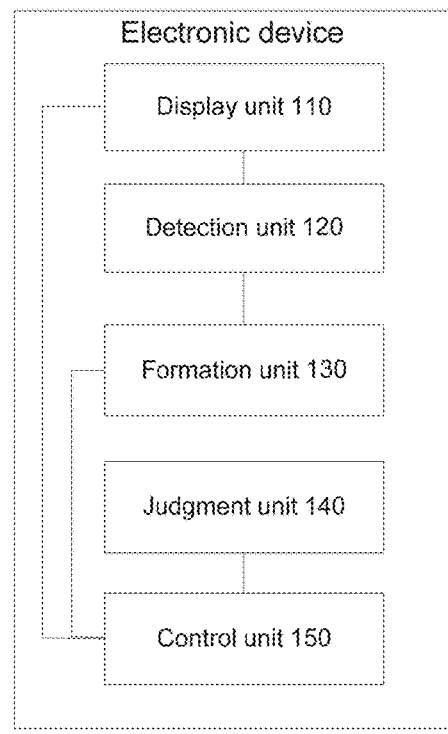
FIG. 4 is a structural diagram of an electronic device according to an embodiment of the present disclosure.

As shown in FIG. 4, the present embodiment provides an electronic device including a display unit 110. The electronic device may further comprise a detection unit 120, a formation unit 130, a judgment unit 140, and a control unit 150, wherein the detection unit 120 is configured to detect a first operation of a user on a first page displayed on the display unit at a first time, to form a first operating parameter, wherein the first page has first display information displayed thereon; the formation unit 130 is configured to, when the first operating parameter satisfies a first preset condition, form and record first indication information to indicate the first display information; the detection unit 120 is further configured to detect a second operation of the user on the first page at a second time to form a second operating parameter; the judgment unit 140 is configured to judge whether the second operating parameter satisfies a second preset condition; and the control unit 150 is configured to, when the second operating parameter satisfies the second preset condition, control the display unit according to the first indication information to perform a first preset operation associated with displaying the first display information; wherein the second time is later than the first time.

The display unit according to the present embodiment may comprise various types of display devices, for example, display structures such as a liquid crystal display screen, an electronic ink display screen, an Organic Light-Emitting Diode (OLED) display screen, or a projection display screen or the like.

The detection unit 120 may be any man-machine interactive interface which can detect a user's operation or a user's input, for example structures such as a touch screen, a floating touch screen, a mouse, a keyboard, or various buttons or the like.

A specific structure of the judgment unit 140 and the control unit 150 may comprise a processor and a storage medium. The processor is connected to the storage medium via a bus. The storage medium has executable codes stored thereon, which may be read and executed by the processor to implement the functions corresponding to the judgment unit 140 and the control unit 150. The judgment unit 140 and the control unit 150 may independently correspond to different processors, or may also collectively correspond to the same processor. When the judgment unit 140 and the control unit 150 collectively correspond to the same processor, the processor implements the functions of the judgment unit 140 and the control unit 150 in a time division multiplexing or a concurrent thread manner. The processor may be a structure having a signal processing capability, such as an Application Processor (AP), a Digital Signal Processor (DSP), a Programmable Logic Controller (PLC), a Micro Controller Unit (MCU), or a Central Processing Unit (CPU) or the like.

The electronic device according to the present embodiment may specifically be a mobile phone, a tablet, an electronic book, a notebook, a desktop, or a wearable device or the like, which can be used to implement information processing and information display, and can intelligently position and search for the first display information which has previously been concerned. Therefore, the electronic device according to the present embodiment has advantages of high intelligence and users' satisfaction.

Second device embodiment

As shown in FIG. 4, the present embodiment provides an electronic device including a display unit 110. The electronic device may further comprise a detection unit 120, a formation unit 130, a judgment unit 140, and a control unit 150, wherein the detection unit 120 is configured to detect a first operation of a user on a first page displayed on the display unit at a first time, to form a first operating parameter, wherein the first page has first display information displayed thereon; the formation unit 130 is configured to, when the first operating parameter satisfies a first preset condition, form and record first indication information to indicate the first display information; the detection unit 120 is further configured to detect a second operation of the user on the first page at a second time to form a second operating parameter; the judgment unit 140 is configured to judge whether the second operating parameter satisfies a second preset condition; and the control unit 150 is configured to, when the second operating parameter satisfies the second preset condition, control the display unit according to the first indication information to perform a first preset operation associated with displaying the first display information; wherein the second time is later than the first time.

The first operating parameter is a first retention duration during which the first display information is retained to be displayed on the display unit.

In the present embodiment, the first operating parameter is specifically defined as a duration during which the first display information is retained to be displayed on the display unit, i.e., the first retention duration. Generally, the longer the display information is retained to be displayed on the display unit, the higher the degree of concern is paid by a user to the information. Therefore, in the present embodiment, based on the characteristic, the first operating parameter comprises the first retention duration.

In a specific implementation, the first operating parameter further comprises read logs or view logs, for example, parameters such as view logs or open logs within a predetermined time, and is not limited to the first retention duration.

In the present embodiment, on the basis of the embodiment described above, a technical solution of judging whether the first operating parameter satisfies the first preset condition according to the first retention duration is provided, which has an advantage that it is simple and convenient to realize. In a specific implementation, the judgment unit 140 may further configured to judge whether the first operating parameter satisfies the first preset condition.

Third device embodiment

As shown in FIG. 4, the present embodiment provides an electronic device including a display unit 110. The electronic device may further comprise a detection unit 120, a formation unit 130, a judgment unit 140, and a control unit 150, wherein the detection unit 120 is configured to detect a first operation of a user on a first page displayed on the display unit at a first time, to form a first operating parameter, wherein the first page has first display information displayed thereon; the formation unit 130 is configured to, when the first operating parameter satisfies a first preset condition, form and record first indication information to indicate the first display information; the detection unit 120 is further configured to detect a second operation of the user on the first page at a second time to form a second operating parameter; the judgment unit 140 is configured to judge whether the second operating parameter satisfies a second preset condition; and the control unit 150 is configured to, when the second operating parameter satisfies the second preset condition, control the display unit according to the first indication information to perform a first preset operation associated with displaying the first display information; wherein the second time is later than the first time.

The first operating parameter is a first retention duration during which the first display information is retained to be displayed on the display unit.

The judgment unit 140 is further configured to determine that the first operating parameter satisfies the first preset condition when the first retention duration is greater than a first time threshold.

A specific structure of the judgment unit 140 may comprise a comparator or a processor having a comparison function. The comparator is configured to compare the first retention duration with the first time threshold, and determine whether the first operating parameter satisfies the first preset condition according to a comparison result.

The judgment unit 140 has a simple structure and is simple and convenient to realize. The electronic device according to the present embodiment can be used to implement the information processing method according to the third method embodiment, and also has advantages that the intelligence and the user's satisfaction are high, and the electronic device has a simple structure and is simple and convenient to realize.

Fourth device embodiment

As shown in FIG. 4, the present embodiment provides an electronic device including a display unit 110. The electronic device may further comprise a detection unit 120, a formation unit 130, a judgment unit 140, and a control unit 150, wherein the detection unit 120 is configured to detect a first operation of a user on a first page displayed on the display unit at a first time, to form a first operating parameter, wherein the first page has first display information displayed thereon; the formation unit 130 is configured to, when the first operating parameter satisfies a first preset condition, form and record first indication information to indicate the first display information; the detection unit 120 is further configured to detect a second operation of the user on the first page at a second time to form a second operating parameter; the judgment unit 140 is configured to judge whether the second operating parameter satisfies a second preset condition; and the control unit 150 is configured to, when the second operating parameter satisfies the second preset condition, control the display unit according to the first indication information to perform a first preset operation associated with displaying the first display information; wherein the second time is later than the first time.

The judgment unit 140 is further configured to determine a first movement direction of the first page according to the second operating parameter; and determine that the second operating parameter satisfies the second preset condition when the first movement direction is a direction in which the first page is moved towards the first display information.

The judgment unit 140 according to the present embodiment firstly determines a first movement direction of the first page according to the second operating parameter. In an example, when a user slides his/her finger upwards on a touch screen of the electronic device, it is determined that the first movement direction of the first page is an upward direction. If the first display information is currently located above the information which is being displayed on the first page, it is considered that the first movement direction is a direction in which the first page is moved towards the first display information.

In the present embodiment, the electronic device determines whether the second operating parameter satisfies the second preset condition according to the first movement direction which is determined according to the second operating parameter. Therefore, the electronic device according to the present embodiment has advantages that it is simple and convenient to realize and a response can be made rapidly. The electronic device according to the present embodiment provides hardware for implementing the fourth method embodiment, and can be used to implement any of the technical solutions according to the fourth method embodiment.

Fifth device embodiment

As shown in FIG. 4, the present embodiment provides an electronic device including a display unit 110. The electronic device may further comprise a detection unit 120, a formation unit 130, a judgment unit 140, and a control unit 150, wherein the detection unit 120 is configured to detect a first operation of a user on a first page displayed on the display unit at a first time, to form a first operating parameter, wherein the first page has first display information displayed thereon; the formation unit 130 is configured to, when the first operating parameter satisfies a first preset condition, form and record first indication information to indicate the first display information; the detection unit 120 is further configured to detect a second operation of the user on the first page at a second time to form a second operating parameter; the judgment unit 140 is configured to judge whether the second operating parameter satisfies a second preset condition; and the control unit 150 is configured to, when the second operating parameter satisfies the second preset condition, control the display unit according to the first indication information to perform a first preset operation associated with displaying the first display information; wherein the second time is later than the first time.

The judgment unit 140 is further configured to determine a first movement speed of the first page according to the second operating parameter; and determine that the second operating parameter satisfies the second preset condition when the first movement speed is less than a first speed threshold.

On the basis of the first device embodiment to the third device embodiment, the present embodiment provides an electronic device different from the electronic device according to the fourth device embodiment. The judgment unit 140 in the electronic device according to the present embodiment is firstly configured to determine a first movement speed of the first page according to the second operating parameter. In an example, if a user rapidly slides his/her finger on a touch screen, the first page is moved rapidly. A correspondence relationship between directions and speeds of the first page and directions and speeds of the first operations may be known with reference to the related art, and will not be described in detail here.

If the first page is moved slowly, it may be the case that the user is searching for some information. According to this application scenario, in the present embodiment, when the first movement speed is less than the first speed threshold, it is determined that the second operating parameter satisfies the second preset condition.

Sixth device embodiment

As shown in FIG. 4, the present embodiment provides an electronic device including a display unit 110. The electronic device may further comprise a detection unit 120, a formation unit 130, a judgment unit 140, and a control unit 150, wherein the detection unit 120 is configured to detect a first operation of a user on a first page displayed on the display unit at a first time, to form a first operating parameter, wherein the first page has first display information displayed thereon; the formation unit 130 is configured to, when the first operating parameter satisfies a first preset condition, form and record first indication information to indicate the first display information; the detection unit 120 is further configured to detect a second operation of the user on the first page at a second time to form a second operating parameter; the judgment unit 140 is configured to judge whether the second operating parameter satisfies a second preset condition; and the control unit 150 is configured to, when the second operating parameter satisfies the second preset condition, control the display unit according to the first indication information to perform a first preset operation associated with displaying the first display information; wherein the second time is later than the first time.

The control unit 150 is further configured to determine a first position of the first display information on the first page according to the first indication information, and control the display unit 110 to perform a first preset operation associated with the first position.

In the present embodiment, the control unit 150 is firstly configured to determine the first position on the first page. The control unit 150 may comprise a positioning structure to determine the first position of the first display information on the first page by calculating coordinate positions of the first display information on the first page.

The control unit 150 is further configured to control the display unit 110 to perform the first preset operation associated with the first position. In a specific implementation, the control unit 150 may comprise an image processor, which may control the display of the display unit or provide display data to the display unit. The control unit 150 controls the display unit 110 to perform the first preset operation, to achieve the purpose of assisting a user in positioning and inquiring the first display information. Therefore, the electronic device according to the present embodiment has advantages of high intelligence and users' satisfaction.

Seventh device embodiment

As shown in FIG. 4, the present embodiment provides an electronic device including a display unit 110. The electronic device may further comprise a detection unit 120, a formation unit 130, a judgment unit 140, and a control unit 150, wherein the detection unit 120 is configured to detect a first operation of a user on a first page displayed on the display unit at a first time, to form a first operating parameter, wherein the first page has first display information displayed thereon; the formation unit 130 is configured to, when the first operating parameter satisfies a first preset condition, form and record first indication information to indicate the first display information; the detection unit 120 is further configured to detect a second operation of the user on the first page at a second time to form a second operating parameter; the judgment unit 140 is configured to judge whether the second operating parameter satisfies a second preset condition; and the control unit 150 is configured to, when the second operating parameter satisfies the second preset condition, control the display unit according to the first indication information to perform a first preset operation associated with displaying the first display information; wherein the second time is later than the first time.

The first indication information comprises position information of the first display information on the first page.

The control unit 150 is further configured to determine a first position of the first display information on the first page according to the position information.

When the first indication information directly records the position information of the first display information on the first page, it is obvious that the control unit 150 may directly determine the first position according to the position information. Therefore, the electronic device according to the present embodiment obviously has advantages that it is simple and convenient to realize and a response can be made rapidly.

Eighth device embodiment

As shown in FIG. 4, the present embodiment provides an electronic device including a display unit 110. The electronic device may further comprise a detection unit 120, a formation unit 130, a judgment unit 140, and a control unit 150, wherein the detection unit 120 is configured to detect a first operation of a user on a first page displayed on the display unit at a first time, to form a first operating parameter, wherein the first page has first display information displayed thereon; the formation unit 130 is configured to, when the first operating parameter satisfies a first preset condition, form and record first indication information to indicate the first display information; the detection unit 120 is further configured to detect a second operation of the user on the first page at a second time to form a second operating parameter; the judgment unit 140 is configured to judge whether the second operating parameter satisfies a second preset condition; and the control unit 150 is configured to, when the second operating parameter satisfies the second preset condition, control the display unit according to the first indication information to perform a first preset operation associated with displaying the first display information; wherein the second time is later than the first time.

The first indication information comprises first identity information of the first display information.

The control unit 150 is further configured to match the first identity information with identity information of various display information on the first page to form a matching result, and determine the first position of the first display information on the first page according to the matching result.

The first identity information according to the present embodiment may be a part of the first display information or information which can identify the first display information such as a title of the first display information, a resource address of the first display information or the like.

When the first indication information comprises the first display information, the control unit 150 according to the present embodiment determines the first position of the first display information by comparing the first identity information with the identity information of various information on the first page.

In this case, the control unit 150 may comprise a processor or a processing chip having an information matching and comparison function or the like.

On the basis of the first device embodiment to the sixth device embodiment, the present embodiment provides an electronic device different from the electronic device according to the seventh device embodiment, which can also intelligently identify the first position of the first display information which has previously been concerned by the user at a first time or of which the retention duration on the display unit achieves the first time threshold. Therefore, the electronic device according to the present embodiment has advantages that the structure is simple, it is simple and convenient to realize, and the electronic device has high intelligence.

Ninth device embodiment

As shown in FIG. 4, the present embodiment provides an electronic device including a display unit 110. The electronic device may further comprise a detection unit 120, a formation unit 130, a judgment unit 140, and a control unit 150, wherein the detection unit 120 is configured to detect a first operation of a user on a first page displayed on the display unit at a first time, to form a first operating parameter, wherein the first page has first display information displayed thereon; the formation unit 130 is configured to, when the first operating parameter satisfies a first preset condition, form and record first indication information to indicate the first display information; the detection unit 120 is further configured to detect a second operation of the user on the first page at a second time to form a second operating parameter; the judgment unit 140 is configured to judge whether the second operating parameter satisfies a second preset condition; and the control unit 150 is configured to, when the second operating parameter satisfies the second preset condition, control the display unit according to the first indication information to perform a first preset operation associated with displaying the first display information; wherein the second time is later than the first time.

The control unit 150 is further configured to control the display unit to display the first display information according to the first position.

In the present embodiment, the control unit 150 controls the display unit to perform the first operation by controlling the display unit to display the first display information. Thereby, it is convenient for a user to rapidly find the first display information in a display area of the display unit without moving the first page. The present embodiment provides hardware for implementing the information processing method according to the tenth method embodiment. The electronic device according to the present embodiment has advantages of high intelligence and users' satisfaction.

Tenth device embodiment

As shown in FIG. 4, the present embodiment provides an electronic device including a display unit 110. The electronic device may further comprise a detection unit 120, a formation unit 130, a judgment unit 140, and a control unit 150, wherein the detection unit 120 is configured to detect a first operation of a user on a first page displayed on the display unit at a first time, to form a first operating parameter, wherein the first page has first display information displayed thereon; the formation unit 130 is configured to, when the first operating parameter satisfies a first preset condition, form and record first indication information to indicate the first display information; the detection unit 120 is further configured to detect a second operation of the user on the first page at a second time to form a second operating parameter; the judgment unit 140 is configured to judge whether the second operating parameter satisfies a second preset condition; and the control unit 150 is configured to, when the second operating parameter satisfies the second preset condition, control the display unit according to the first indication information to perform a first preset operation associated with displaying the first display information; wherein the second time is later than the first time.

The control unit 150 is further configured to display information in the first position on the first page according to a first display parameter value so that the first display information differs from second display information displayed according to a second display parameter value; wherein, the second display information is display information on the first page surrounding the first display information; and the first display parameter value and the second display parameter value are different parameter values of the same display parameter.

The control unit 150 according to the present embodiment is primarily configured to control the display unit to highlight the first display information, so that the display effect of the first display information is different from the display effect of the second display information surrounding the first display information. Thereby, the user can take notice of the first display information immediately. The technical solution according to the present embodiment can also facilitate the user to rapidly position and find the first display information.

The control unit 150 according to the present embodiment may further comprise an image processor for controlling the display of the display unit. The first preset operation may comprise resetting the display parameter value of the first display information, and displaying the first display information according to the display parameter value.

Specifically, the display parameter comprises a luminance parameter and/or a color parameter.

In conclusion, the present embodiment provides an electronic device which can assist the user in rapidly finding the first display information which has been concerned at a historical time or which is retained on the display unit for a long time. The electronic device according to the present embodiment better utilizes the software resources of the electronic device, thereby improving the intelligence of the electronic device and the users' satisfaction.

Several specific examples will be provided below in conjunction with any of the embodiments described above.

Figure 5:
FIG. 5 is a display effect diagram of an information processing method according to an example of the present disclosure.

Firstly, a user views information in an electronic device such as a mobile phone or a tablet or the like, and a current touch operation of the user is recorded by the electronic device. When the user retains on the current list information interface for a retention time longer than a preset value of the system, the electronic device automatically records the first information of the current list as information in a first position. The touch operation is the first operation, the retention time is the first retention duration, and the preset value may be the first time threshold. The information formed by recording the first information is the indication information described above. FIG. 5 illustrates an effect diagram of displaying the information in the first position at the current time.

Next, the user slides his/her finger upwards to a new second position and then rapidly slides his/her finger downwards on the screen. The electronic device judges, according to the acquired sliding operation of the user, whether the user wants to return the page to the first position where the information has previously been viewed or wants to move the page downwards to another position. If it is judged that the user wants to return the page to the position where the information has previously been viewed, the display effect of the electronic device is shown in FIG. 7; otherwise, the display effect diagram of the electronic device which is processed at the sliding speed of the user's finger may be shown in FIG. 6.

It may be determined whether to return to display the information in the first position or display the information in the second position in the following manner.

It is judged whether the current list view is in an onmove state or a flinging state according to a pressing state and a lifting state of the user's finger. The onmove state is a moving state after the user's finger is pressed down and before the user's finger is lifted up, and the flinging state is an inertial moving state of the list after the user's finger is pressed down and then is lifted up.

If the current list view is in the onmove state, the list view is moved according to the user's operation instead of stopping in the first position.

If the current list view is in the flinging state, an instantaneous speed of the current list view is calculated according to an initial speed and an initial instantaneous acceleration at which the list view is moved at the time when the user's finger is lifted up, which are acquired by the system, and is compared with a threshold of the system. If the instantaneous speed is greater than the threshold, it is considered that the user wants to move the list view all the time, instead of returning the page to the first view position, and at this time, the list view is moved in a manner used by the system; and if the instantaneous speed is less than the threshold, the list is positioned in the first view position.

If the electronic device receives, from the user, an operation of rapidly sliding a finger to move the list many times within a short period of time, the electronic device only records an initial speed and an initial instantaneous acceleration of the last sliding operation for judgment.

The first time threshold stored in the electronic device may be actively set by the user or may be calculated according to the user's habits recorded by the electronic device.

In addition, the electronic device may make a determination by obtaining the title information of the current item and comparing the title information with the information recorded by the system, to identify the item where the information in first position is located, and display the item on the top of the electronic device for convenience of view by the user.

Figure 6:
FIG. 6 is a first display effect diagram formed based on FIG. 5.
Figure 7:
FIG. 7 is a second display effect diagram formed based on FIG. 5.

In the scenarios of viewing sports information illustrated in FIGS. 5-7, the user views sports news using the NetEase news client. When the user retains on the interface illustrated in FIG. 5 for a retention time longer than a threshold of the system, the news item "马竞预购满城锋霸 接替科斯塔" is used as the information in the first view position for the user. In this case, the user may want to view news which are previously neglected and slide his/her finger to move the page upwards to the news item "国乒小将16 岁日本夺冠记录" illustrated in FIG. 6 which is used as the information in the second view position for the user. Next, the user rapidly slides his/her finger on the screen, and the system judges whether the user wants to return the page to the position where the information has previously been viewed or wants to move the page downwards to another position according to the acquired sliding operation of the user. If it is judged that the user wants to return the page to the first position where the information has previously been viewed, the list is positioned in the position illustrated in FIG. 7 and stops; otherwise, the list is processed at a sliding speed of the user. With the method, the efficiency of the user's sliding operation can be effectively enhanced and the user experience can be largely improved.

It should be understood that the devices and methods disclosed in the embodiments of the present disclosure may be implemented in other manners. The device embodiments as described above are merely illustrative. For example, the division of the units is merely a logically functional division, and in practice, there may be other division manners. For example, multiple units or components may be combined or may be integrated into another system, or some features may be ignored or may not be implemented. In addition, various constituent parts, which are displayed or discussed as being coupled or communicatively connected directly, may also be coupled or communicatively connected indirectly via some interfaces, devices or units in an electrical manner, a mechanical manner, or other manners.

The above units described as separate components may be or may not be separated physically. The components displayed as units may be or may not be physical units, i.e., they may be located in a place or may also be distributed among multiple network units. A part or all of the units may be selected as needed to achieve the purpose of the solutions of the present disclosure.

In addition, various functional units according to the embodiments of the present disclosure may all be integrated into a processing module, or various units may be used separately, or two or more units are integrated into a unit. The above integrated units may be implemented by hardware or by hardware and software functional units.

A person having ordinary skill in the art can understand that all or a part of steps for implementing the above method embodiments may be implemented by programs instructing related hardware. The programs may be stored in a computer readable storage medium. When the programs are executed, the steps of the above method embodiments are implemented. The storage medium may be a medium which can store program codes, such as a mobile storage device, a Read-Only Memory (ROM), a Random Access Memory (RAM), a disk, or a disc etc.

The above description is merely specific embodiments of the present disclosure, and the scope of the present disclosure is not limited thereto. Changes or substitutions, which can be obviously envisaged by those skilled persons in the art, should be included in the scope of the present disclosure without departing the scope defined by the appended claims.

I claim:

1. An information processing method applied in an electronic device comprising a display, the method comprising:
   detecting, by the electronic device, a first operation of a user on a first page displayed on the display at a first time, to form a first operating parameter, wherein the first page has first display information displayed thereon, wherein the first operating parameter is a first retention duration during which the first display information is retained to be displayed;
   when the first operating parameter satisfies a first preset condition, forming and recording, by the electronic device, first indication information to indicate the first display information, wherein the first indication information comprises position information of the first display information on the first page and first identity information of the first display information;
   detecting, by the electronic device, a second operation of the user on the first page at a second time to form a second operating parameter;
   judging, by the electronic device, whether the second operating parameter satisfies a second preset condition; and
   when the second operating parameter satisfies the second preset condition, controlling, by the electronic device, performing a first preset operation according to the first indication information to display the first display information in a predetermined position or highlight the first display information, which assists the user in searching for and positioning the first display information,
   wherein the second time is later than the first time, and
   wherein the judging of whether the second operating parameter satisfies a second preset condition comprises:
   determining, by the electronic device, a first movement direction of the first page according to the second operating parameter; and
   when the first movement direction is a direction in which the first page is moved towards the first display information, determining, by the electronic device, that the second operating parameter satisfies the second preset condition.

2. The method according to claim 1, wherein the judging of whether the second operating parameter satisfies a second preset condition comprises:
   when the first retention duration is greater than a first time threshold, determining, by the electronic device, that the first operating parameter satisfies the first preset condition.

3. The method according to claim 1, wherein the judging of whether the second operating parameter satisfies a second preset condition comprises:
   determining, by the electronic device, a first movement speed of the first page according to the second operating parameter; and
   when the first movement speed is less than a first speed threshold, determining, by the electronic device, that the second operating parameter satisfies the second preset condition.

4. The method according to claim 1, wherein the controlling of the display according to the first indication information to perform a first preset operation associated with displaying the first display information comprises:
   determining, by the electronic device, a first position of the first display information on the first page according to the first indication information; and
   controlling, by the electronic device, the display to perform the first preset operation associated with the first position.

5. The method according to claim 4, wherein the first indication information comprises position information of the first display information on the first page; and
   wherein the determining of a first position of the first display information on the first page according to the first indication information comprises:
   determining, by the electronic device, the first position of the first display information on the first page according to the position information.

6. The method according to claim 4, wherein the first indication information comprises first identity information of the first display information; and
   wherein the determining of a first position of the first display information on the first page according to the first indication information comprises:
   matching, by the electronic device, the first identity information with identity information of various display information on the first page to form a matching result; and
   determining, by the electronic device, the first position of the first display information on the first page according to the matching result.

7. The method according to claim 4, wherein the controlling of the display to perform the first preset operation associated with the first position comprises:
   controlling, by the electronic device, the display to display the first display information according to the first position.

8. The method according to claim 4, wherein the controlling of the display to perform the first preset operation associated with the first position comprises:
   displaying, by the electronic device, information in the first position on the first page according to a first display parameter value so that the first display information differs from second display information displayed according to a second display parameter value;
   wherein the second display information is display information on the first page surrounding the first display information; and wherein the first display parameter value and the second display parameter value are different parameter values of the same display parameter.

9. The method according to claim 8, wherein the display parameter comprises a luminance parameter and/or a color parameter.

10. An electronic device comprising:
a display;
a processor;
a memory storing instructions which cause, when executed by the processor, the processor to:
detect a first operation of a user on a first page displayed on the display at a first time, to form a first operating parameter, wherein the first page has first display information displayed thereon, wherein the first operating parameter is a first retention duration during which the first display information is retained to be displayed;
when the first operating parameter satisfies a first preset condition, form and record first indication information to indicate the first display information, wherein the first indication information comprises position information of the first display information on the first page and first identity information of the first display information;
detect a second operation of the user on the first page at a second time to form a second operating parameter;
judge whether the second operating parameter satisfies a second preset condition; and
when the second operating parameter satisfies the second preset condition, performing a first preset operation according to the first indication information to display the first display information in a predetermined position or highlight the first display information, which assists the user in searching for and positioning the first display information,
wherein the second time is later than the first time,
and wherein the instructions which cause, when executed by the processor, the processor further to, determine a first movement direction of the first page according to the second operating parameter; and when the first movement direction is a direction in which the first page is moved towards the first display information, determine that the second operating parameter satisfies the second preset condition.

11. The electronic device according to claim 10, wherein the instructions which cause, when executed by the processor, the processor further to, when the first retention duration is greater than a first time threshold, determine that the first operating parameter satisfies the first preset condition.

12. The electronic device according to claim 10, wherein the instructions which cause, when executed by the processor, the processor further to, determine a first movement speed of the first page according to the second operating parameter; and when the first movement speed is less than a first speed threshold, determine that the second operating parameter satisfies the second preset condition.

13. The electronic device according to claim 10, wherein the instructions which cause, when executed by the processor, the processor further to determine a first position of the first display information on the first page according to the first indication information; and control the display to perform the first preset operation associated with the first position.

14. The electronic device according to claim 13, wherein the first indication information comprises position information of the first display information on the first page; and
wherein the instructions which cause, when executed by the processor, the processor further to determine the first position of the first display information on the first page according to the position information.

15. The electronic device according to claim 13, wherein the first indication information comprises first identity information of the first display information; and
wherein the instructions which cause, when executed by the processor, the processor further to match the first identity information with identity information of various display information on the first page to form a matching result, and to determine the first position of the first display information on the first page according to the matching result.

16. The electronic device according to claim 13, wherein the control unit is further configured to control the display unit to display the first display information according to the first position.

17. The electronic device according to claim 13, wherein the instructions which cause, when executed by the processor, the processor further to display information in the first position on the first page according to a first display parameter value so that the first display information differs from second display information displayed according to a second display parameter value;
wherein the second display information is display information on the first page surrounding the first display information; and
wherein the first display parameter value and the second display parameter value are different parameter values of the same display parameter.

18. The electronic device according to claim 17, wherein the display parameter comprises a luminance parameter and/or a color parameter.

* * * * *